Sept. 1, 1964             C. J. WOLF             3,146,669

COLLAPSIBLE NOZZLE EXIT CONE FOR TUBE LAUNCHED MISSILE

Filed Oct. 24, 1962

INVENTOR.
CALVIN J. WOLF
BY *D. C. Hodges* ATTY.

3,146,669
COLLAPSIBLE NOZZLE EXIT CONE FOR TUBE LAUNCHED MISSILE
Calvin J. Wolf, New Ulm, Minn., assignor to the United States of America as represented by the Secretary of the Navy
Filed Oct. 24, 1962, Ser. No. 232,912
4 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

This invention relates generally to tube launched missiles and more particularly to a collapsible exit nozzle therefor.

The invention described herein is primarily concerned with high pressure ratio rocket engines that are capable of propelling missiles at extremely high speeds. The exhaust gases of such an engine are at a relatively high temperature, high pressure and low velocity within the combustion chamber and are expanded to atmospheric pressure through a suitable nozzle at a relatively high velocity, low temperature and low pressure to propel the missile. The exhaust gas velocity at the rocket engine nozzle outlet is a function of the gas temperature within the combustion chamber and of the expansion ratio through the nozzle. Maximum efficiency of the available energy in the exhaust gases of a high pressure ratio rocket engine can be best obtained by complete expansion of the exhaust gases to ambient pressure through a convergent-divergent nozzle.

In tube launched missiles it has been necessary to maintain the outside diameter of the nozzle equal to or less than the maximum outside diameter of the missile such that the configuration will fit into a missile launching tube. In the past, in order to meet this requirement it has been the general practice to terminate the exit nozzle cone at a point where its outside diameter is equal to or less than the outside diameter of the missile. Termination of the exit nozzle cone at this limited diameter in many applications results in an under-expansion of the rocket exhaust gases thus reducing the thrust created by the rocket motor and causing a loss in performance of the missile.

A principal object of this invention is, therefore, to provide an exit nozzle for tube launched missiles which is of sufficient area to allow complete expansion of the exhaust gases without regard to limitations of the outside diameter of the missile.

Another object of this invention is the provision of an exit nozzle for a tube launched missile which initially may be collapsed to a diameter at least equal to or less than the maximum outside diameter of the missile such that the missile may be inserted into a launching tube and which, after launch from the tube, is expanded to a diameter which provides sufficient area within the exit nozzle to produce complete expansion of the exhaust gases.

A further object is the provision of an exit nozzle for a tube launched missile which may be collapsed to a diameter equal to or less than the maximum diameter of the missile body for insertion into a missile launching tube and which upon leaving of the launching tube is expanded to a diameter which allows complete expansion of the exhaust gases and which after such expansion is locked in place.

Other objects of this invention are the provision of an exit nozzle for tubed launched missiles which may be collapsed to a diameter equal to or less than the maximum outside diameter of the missile body such that the missile may be inserted into a launching tube and which is automatically expanded upon launch from the missile launching tube without the aid of mechanical or hydraulic driving means, which is simple of manufacture, economical in cost, and reliable in operation.

To accomplish the foregoing objects the present invention contemplates a plurality of elongated, resilient flaps arranged in overlapping fashion about the base cone of the rocket motor and secured thereto such that alternate laps may be slid over intermediate flaps in order to reduce the outer diameter of the exit nozzle to the outer diameter of the missile body. When the missile is launched from the launching tube the flaps expand to a diameter which provides sufficient area within the exit nozzle to allow complete expansion of the rocket engine exhaust gases due to the resiliency of the flaps and the internal pressure created within the exit nozzle by virtue of the high pressure gases escaping therefrom. The invention further provides a limiting mechanism for limiting the maximum diameter of the exit nozzle to the desired diameter and a locking device for locking the flaps in this position.

Further objects and many of the attendant advantages of this invention will be more readily appreciated as the same becomes better understood by reference to the following detailed description when considered in connection with the accompanying drawings which constitute illustrative embodiments of the invention while the novel features thereof will be more particularly pointed out hereinafter in connection with the appended claims.

Referring now to the drawing wherein like reference numerals designate like or corresponding parts throughout the various figures thereof:

Figure 1:
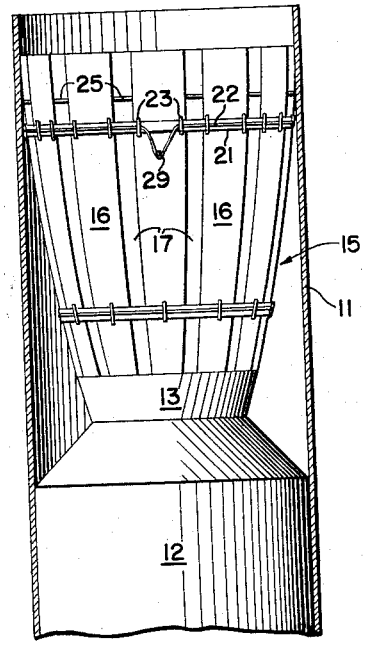
FIG. 1 illustrates a tube launched missile embodying the instant invention when the missile is in the launching tube and the exit nozzle is at its reduced diameter.

Referring in greater detail to the drawings and more particularly to FIG. 1 thereof there is illustrated in section a missile launching tube 11 having disposed therein a missile to be launched therefrom generally comprising a missile body 12 and a base cone 13 of conventional construction, it being understood that the interior configuration of the base cone and that portion of the missile body adjacent thereto is formed into a convergent-divergent nozzle through which the exhaust gases of the rocket motor are expanded for the purpose of propelling the missile.

Circumferentially arranged about the base cone 13 in overlapping fashion are a plurality of resilient, tapered, elongated exit nozzle flaps 16–17 arranged in such a manner as to form a collapsible exit nozzle cone generally indicated by the reference numeral 15. Alternate flaps 16 overlap each of the intermediate flaps 17 such that, as the diameter of the exit cone is increased or decreased, the alternate flaps slide over the exterior surface of the intermediate flaps. The flaps 16 and 17 are constructed of any suitable high heat resistant material which is resilient in character whereby the flaps may be bent and restrained for substantial periods of time in the shape illustrated in FIG. 1 such that the outer diameter of the exit nozzle is equal to or less than the outer diameter of the main body of the missile so that the missile may be inserted into a launching tube. Upon launching of the missile the flaps, because of the resiliency of each of the flaps and of the high pressures created within the exit nozzle due to the expansion of the gases through the convergent-divergent nozzle, will spring outwardly to a diameter thereby allowing complete expansion of the exhaust gases.

Examples of suitable materials having the requisite high heat resisting and resilient properties are the Fe-Ni-Cr-Mo-nickel base alloys or The Precipitation-Hardening Stainless Steels, the specific compositions and structural properties of which are found in the chapter entitled Wrought Heat-Resisting Alloys in Metals Handbook, Properties and Selection of Materials, vol. I, 8th ed., 1961, published by The American Society for Metals, Metals Park, Novelty, Ohio. It should be understood that, if desired, the exit nozzle may also be constructed of any of the high heat resistant plastics which have suitable resilient characteristics.

Figure 2:
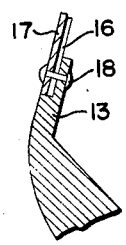
FIG. 2 illustrates in section a portion of a modification of FIG. 1.

The flaps may be secured either to the outer surface of the base cone 13 as illustrated in FIG. 1 or to the interior surface of base cone 13 as illustrated in FIG. 2 by any suitable means such, for example, depending upon the material used for the base cone and the exit nozzle, as by welding, riveting or by any type of securing ring which will clamp the flaps to the base cone. As illustrated in FIG. 2 the interior surface of the base cone 13 may be recessed to receive the intermediate flap 17 which may be secured thereto by rivet 18 such that the interior surface of the intermediate flaps form a smooth continuation of the divergent portion of the convergent-divergent nozzle, it being understood that the recess within the base cone 13 will be of a greater depth to accommodate the overlapping alternate flaps 16 that have been hereinbefore described.

Circumferentially disposed about the exit nozzle flaps is a pair of limit devices which limit the maximum diameter of the exit nozzle when the missile has left the launching tube. One illustrative embodiment of the limit devices illustrated in FIGS. 1 and 3 comprises a strap or band 21 of any suitable material such, for example, as steel, which is split and overlapped such that it can be expanded. About the strap or band 21 is a small cable 22 of fixed length which determines the maximum diameter to which the flaps may be expanded. Band 21 and cable 22 are held in place by a plurality of eyelets 23 which may comprise short length of material secured in any suitable manner to the flaps and beneath which the strap 21 and the cable 22 are passed.

Figure 4:
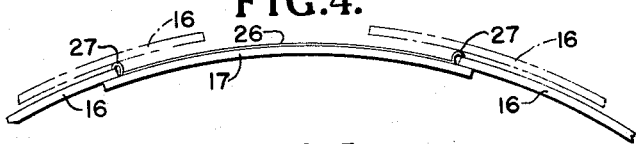
FIG. 4 illustrates in greater detail one contemplated embodiment of a lock for locking the flaps at their maximum diameter.

Secured to the intermediate flaps is an overriding lock 25 which serves to lock the collapsible exit nozzle in its maximum diameter after expansion thereof. Referring now to FIG. 4 wherein the lock 25 is illustrated in greater detail and which illustrates an end view of the flaps, the overriding lock may comprise a body portion 26 secured to the intermediate flaps and a pair of upstanding portions 27 at the ends thereof arranged in such a manner that when the exit nozzle has expanded and the alternate flaps 16 drop to an abutting relation to the intermediate flaps 17 the upstanding portion 27 prevents their subsequent collapse. The position of the alternate flaps in the collapsed condition is illustrated in phantom in FIG. 4 and, as illustrated, the interior surface of alternate straps 16 override the upstanding portion 27 of the lock 25. As the missile leaves the launching tube and the flaps expand, the alternate flaps, once their respective edges clear the upstanding portion, drop into engagement with the intermediate flaps. At this point the limiting cable 22 limits the outward expansion of the flaps and thereafter holds the alternate flaps 16 in abutting engagement with the upstanding portion 27 of lock 25. As illustrated, the upstanding portion has a downward turned end such that as the edge of the alternate flaps reach the downward turned portion and are limited by the limiting cable, the upstanding portion 27 is flexed inwardly to allow the alternate flap to snap into abutting engagement with the intermediate flap and thereafter is secured in this position by the upstanding portion 27. Thus, when the pressures within the exit nozzle are reduced as the rocket motor burns out, the maximum diameter of the collapsible exit nozzle is maintained even through the aerodynamic forces on the outer surface thereof may become greater than the interior pressure created by the escaping gases.

Figure 3:
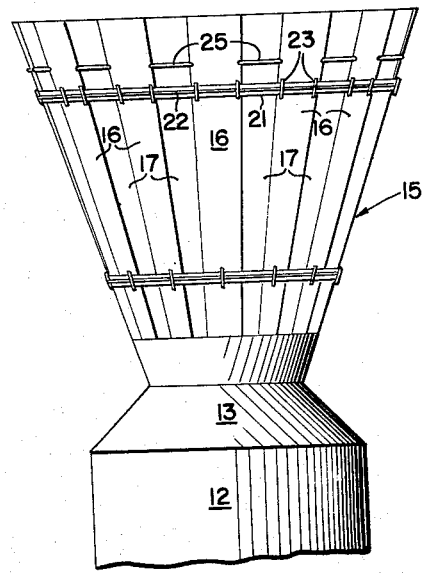
FIG. 3 illustrates a tube launched missile embodying the instant invention after the missile has left the launching tube and the exit nozzle is expanded to its maximum diameter.

FIG. 3 illustrates a plan view of the exit nozzle locked in place by locks 25 in its fully expanded condition such that the maximum diameter thereof is substantially greater than the maximum diameter of the missile body.

If desired, the slack in limiting cable 22 when the flaps are in the collapsed condition may be taken up in any suitable manner as, for example, by looping the cable over a shearable rivet 29 which may be secured to or intergally formed in one or more of the alternate flaps as illustrated in FIG. 1. It should be understood that, if desired, the strength of rivet 29 may be such as to retain the flaps in the collapsed condition in the absence of any internal pressure within the exit nozzle such that loading of the missile into a missile launching tube may be facilitated but which is of insufficient strength to retain the flaps in the collapsed position in the presence of the interior pressure created within the exit nozzle when the rocket is fired. Further, if desired, the flaps may be engaged by a retaining ring about the ends thereof to maintain the exit nozzle in the collapsed condition to facilitate loading into a missile tube and which may be stripped off by the edge of the tube as the missile is loaded therein or as the missile is fired therefrom.

Figure 5:
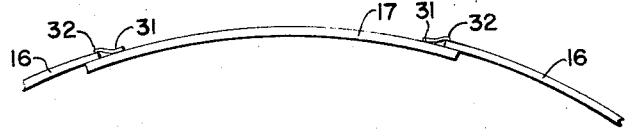
FIG. 5 illustrates in detail a second contemplated embodiment of a flap lock.

Referring now to FIG. 5 there is illustrated a second illustrative embodiment of the flap locking feature which may be utilized with a limiting cable which possesses a small degree of elasticity. As illustrated in FIG. 5 separate locks are provided for each alternate flap, the locks comprising a body portion 31 secured near the outer edge of the intermediate flaps 17 and have an arcuate portion 32 which when the nozzle is in the expanded condition engages the adjacent alternate flap 16 and secures it in the expanded condition. The lock illustrated in FIG. 5 when compared with the lock illustrated in FIG. 4 is substantially more rigid and is utilized with a limit band having a small degree of elasticity. In operation, as the flaps spring outwardly due to the resiliency thereof and the internal pressures created within the exit nozzle, the alternate flaps 16 slide over locks 32 and the limit band is arranged such that the elasticity thereof allows the alternate flaps to clear the end of the arcuate portion 32 and the elasticity of the limit band then snaps the alternate flaps into abutting relation with the intermediate flaps 17 and thereafter tends to slightly collapse the exit nozzle such that the alternate flaps are pulled into the space between the intermediate flaps 17 and the arcuate portion 32.

Figure 6:
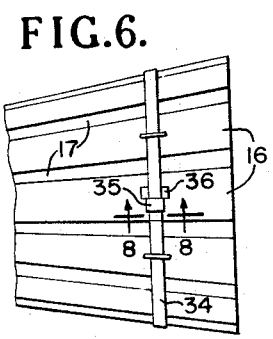
FIG. 6 illustrates a second contemplated embodiment of the limit band for limiting the maximum diameter of the exit nozzle.
Figure 7:
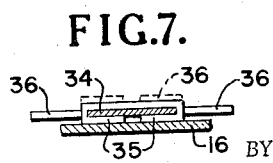
FIG. 7 illustrates in greater detail a portion of the limit band of FIG. 6.

Referring now to FIGS. 6 and 7 there is illustrated a second exemplary embodiment of a limit band 34 which does not necessitate employment of the cable utilized in the embodiment of FIGS. 1 and 3. The limit band comprises an elongated band having an expanded portion at each end thereof, the expanded portion at one end being looped around the band as best illustrated at 35 in FIG. 7 while the expanded portion 36 at the other end thereof is left extending or, if desired, may be looped over the band in the opposite direction as expanded portion 35 illustrated in phantom. As is apparent the elongated body portion of the band 34 may slide through the end portion 35 such that the diameter of the band may be reduced and upon expansion of the flaps when the missile leaves the launching tube the diameter expands until the end portion 35 contacts the end portion 36 which arrests the expansion of the band 34 to thereby limit the outer diameter of the exit nozzle.

Figure 8:
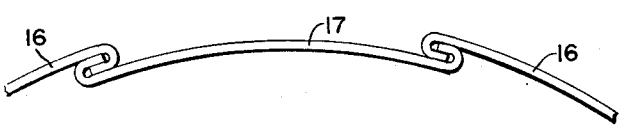
FIG. 8 illustrates in detail a still further embodiment of the exit nozzle flaps having limiting and locking features integrally formed therein.

Referring now to FIG. 8 there is illustrated another embodiment of the flaps in which the limiting and locking features thereof are formed as an integral portion of the various flaps. As illustrated, alternate flaps 16 have an under-turned end portion at each edge thereof while each edge of intermediate flaps 17 have an outward-turned portion. As is apparent, the alternate flaps 16 may slide over the external surface of intermediate flaps 17 as the exit nozzle is collapsed and when the missile leaves the launching tube the spring action created by the resiliency of the various flaps and the internal pressure expands the nozzle diameter until the edge portion of the flaps are engaged and locked together as illustrated in FIG. 8. The spacing between the under-turned portion and the internal surface of flaps 16 and likewise the spacing between the outward-turned portion and the external surface of intermediate flaps 17 may be such that once the end portions thereof are engaged as illustrated in FIG. 8 sufficient frictional forces occur so as to lock the flaps in the expanded condition. It should be understood that, if desired, the turned portions of alternate flaps may be provided with a groove while the turned portions of intermediate flaps may be provided with a bead such that the bead may be forced into the groove within the alternate turned portions under the forces of the resilient flaps and of the internal pressure therein so as to form a bead and groove lock to insure that the flaps remain locked in the expanded condition even though the pressure created within the exit nozzle by the expanding gases decreases below the external pressure thereon created by the aerodynamic forces.

There has been illustrated and described a collapsible exit nozzle for use with tube launched missiles which may be collapsed to a diameter equal to or less than the external diameter of the missile such that the missile may be fitted into a launching tube and which upon launching of the missile expands to a larger diameter to allow complete expansion of the exhausted gases within the exit nozzle to increase the thrust and provide for maximum rocket engine performance. While the exit nozzle has been illustrated as a linearly divergent nozzle it will be apparent to those skilled in the art, after understanding the invention, that the exit nozzle may take any desired form such, for example, as one having curved interior surface so as to form a smooth continuation of a contoured nozzle.

There has been further illustrated and described various devices for limiting the maximum diameter of the exit nozzle and for locking the flaps at this diameter such that even though the interior pressure within the exit nozzle decreases below the pressure exerted upon the exterior of the nozzle by the aerodynamic forces the nozzle cone will remain rigid, a condition that is desirable in high drag nozzles. The overlap of the alternate flaps with the intermediate flaps and the locking features provide sufficient self-sealing such that no exhaust gas leakage from the flap arrangement results. Further, the limiting and locking devices illustrated by the various embodiments maintain the nozzle rigid at its expanded diameter and thus prevent distortion of the nozzle which may result in erratic flight.

While the invention has been described in detail in connection with various exemplary embodiments illustrated in the drawing, for the sake of clarity it should be understood that numerous modifications and variations are possible in light of the above teachings which may be resorted to by those skilled in the art without departing from the spirit and scope of the invention as hereinafter defined by the appended claims.

What is claimed as new and desired to be secured by Letters Patent of the United States is:

1. In combination with a missile mounted within a launching tube, said missile having a body portion and a base cone at one end thereof, the improvement comprising: a plurality of resilient flaps secured in overlapping relationship to form a hollow conically shaped nozzle secured at the minimum diameter thereof to said base cone, said nozzle being collapsible within said tube to a diameter equal to or less than the outer diameter of said missile and expansible upon removal from said tube to a diameter greater than the outer diameter of said missile, limiting means secured about said flaps for limiting the maximum diameter thereof after removal from said tube and locking means attached to said flaps for maintaining said flaps at said maximum diameter.

2. In combination with a missile mounted within a launching tube, said missile having a body portion and a base cone at one end thereof having a convergent-divergent interior configuration, the improvement comprising: a plurality of resilient flaps circumferentially arranged in overlapping relationship to form a conically shaped exit nozzle, said exit nozzle being secured at the minimum diameter thereof to said base cone, said exit nozzle being collapsible within said tube to a diameter equal to or less than the outer diameter of said missile and expansible upon removal from said tube to a diameter greater than the outer diameter of said missile, locking means integrally formed along the overlapping portion of each of said flaps for engagement with the locking means along the overlapping portion of the next adjacent flap when said flaps are unrestrained whereby said exit nozzle may be compressed during loading and firing of the missile from a launching tube and expanded due to the resiliency in said flaps until engagement of said locking means.

3. In combination with a missile mounted within a launching tube, said missile having a body portion and a base cone at one end thereof, said base cone having a convergent-divergent interior configuration, the improvement comprising: a plurality of resilient flaps circumferentially arranged in overlapping fashion to form a conical shaped exit nozzle, said exit nozzle being secured at the minimum diameter thereof to said base cone, said exit nozzle being collapsible within said tube to a diameter equal to or less than the outer diameter of said missile and expansible upon removal from said tube to a diameter greater than the outer diameter of said missile, limit means disposed about said flaps for limiting the maximum diameter of expansion of said flaps after removal from said tube, and locking means secured to intermediate ones of said flaps for engaging alternate flaps when the maximum diameter of expansion of said flaps is reached whereby said exit nozzle may be compressed during loading and firing of the missile from a launching tube and thereafter expanded due to the resiliency in said flaps and the internal pressure within said nozzle and may be locked in a diameter which allows complete expansion of the exhaust gases when the missile leaves the launching tube.

4. The combination of claim 3 wherein said limit means comprises an expansible band and said locking means includes an upstanding portion for engaging said alternate flaps.

References Cited in the file of this patent

UNITED STATES PATENTS

| | | |
|---|---|---|
| 2,603,062 | Weiler et al. | July 15, 1952 |
| 2,634,578 | Kallal | Apr. 14, 1953 |
| 2,658,333 | Smialowski | Nov. 10, 1953 |
| 2,865,165 | Kress | Dec. 23, 1958 |
| 2,870,602 | Glenn | Jan. 27, 1959 |